(Model.)

F. A. BROWNELL.
PHOTOGRAPHIC CAMERA.

No. 579,126.        Patented Mar. 23, 1897.

3 Sheets—Sheet 1.

Witnesses
Thomas Durant
Anna M. Kelly

Inventor
Frank A. Brownell
by Church & Church
his Attys (Model.) 3 Sheets—Sheet 2.
F. A. BROWNELL.
PHOTOGRAPHIC CAMERA.
No. 579,126. Patented Mar. 23, 1897.
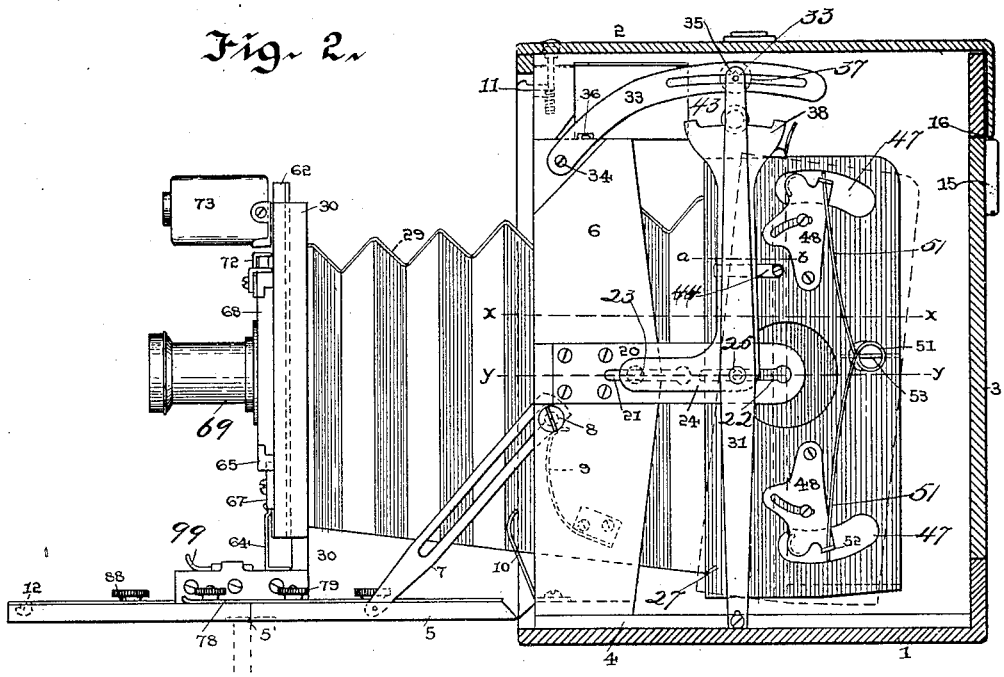
Fig. 2.
Fig. 10.
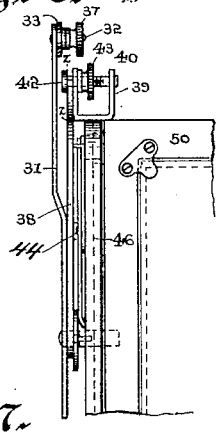
Fig. 6.
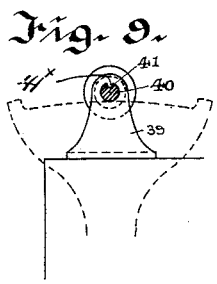
Fig. 9.
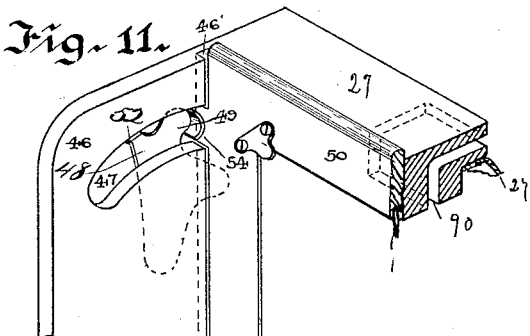
Fig. 11.
Fig. 7.
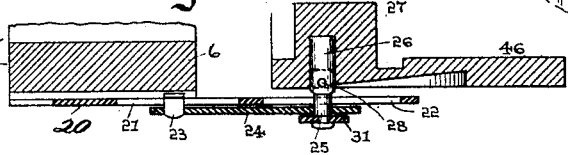
Fig. 8.
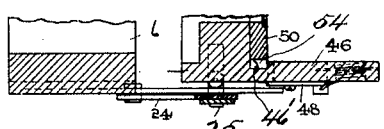
Witnesses
Thomas Durant
Anna M. Kelly
Inventor
Frank A. Brownell
by Church & Church
his atty.

(Model.)
F. A. BROWNELL.
PHOTOGRAPHIC CAMERA.
No. 579,126.
3 Sheets—Sheet 3.
Patented Mar. 23, 1897.
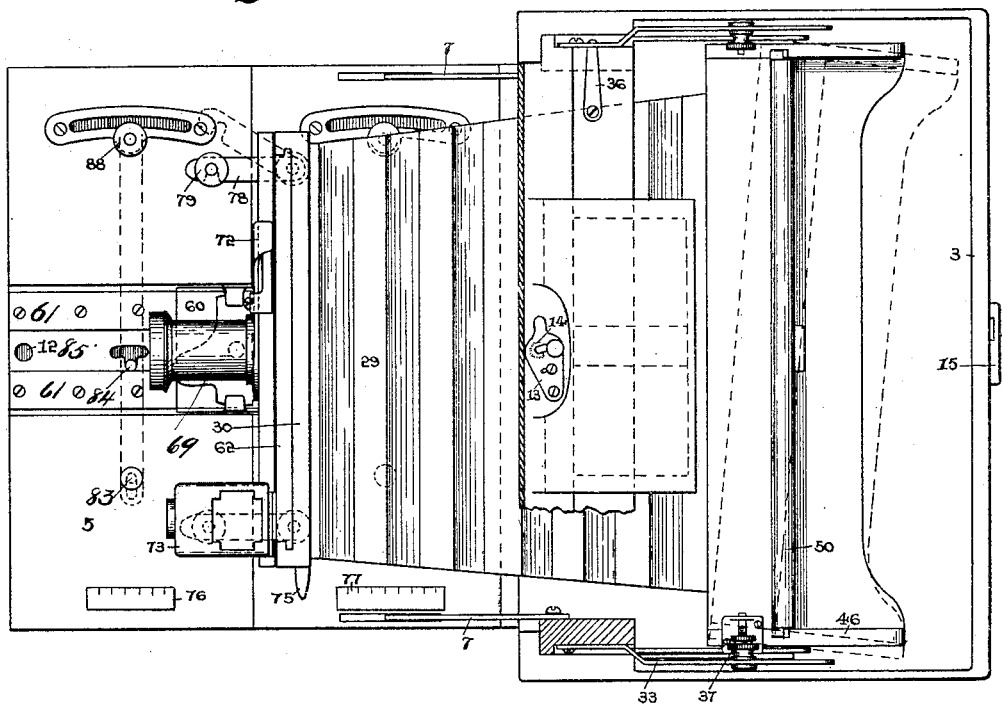
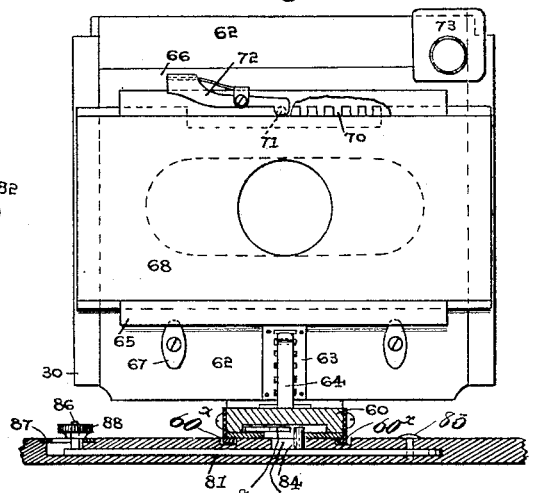
Witnesses
Thomas Durant
Anna M. Kelly
Inventor
Frank A. Brownell
by Church & Church
his attys

United States Patent Office.

FRANK A. BROWNELL, OF ROCHESTER, NEW YORK, ASSIGNOR TO THE EASTMAN KODAK COMPANY, OF SAME PLACE.

PHOTOGRAPHIC CAMERA.

SPECIFICATION forming part of Letters Patent No. 579,126, dated March 23, 1897.

Application filed May 18, 1893. Serial No. 474,704. (Model.)

*To all whom it may concern:*

Be it known that I, FRANK A. BROWNELL, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My present invention has for its object to improve the construction and operation particularly of that class of cameras adapted to be folded into compact shape for transportation, though parts of it are well adapted for the ordinary non-folding variety; and the invention consists of certain improvements in construction and combinations of parts, all as will be hereinafter fully described, and the novel features pointed out in the claims at the end of this specification.

Figure 1:
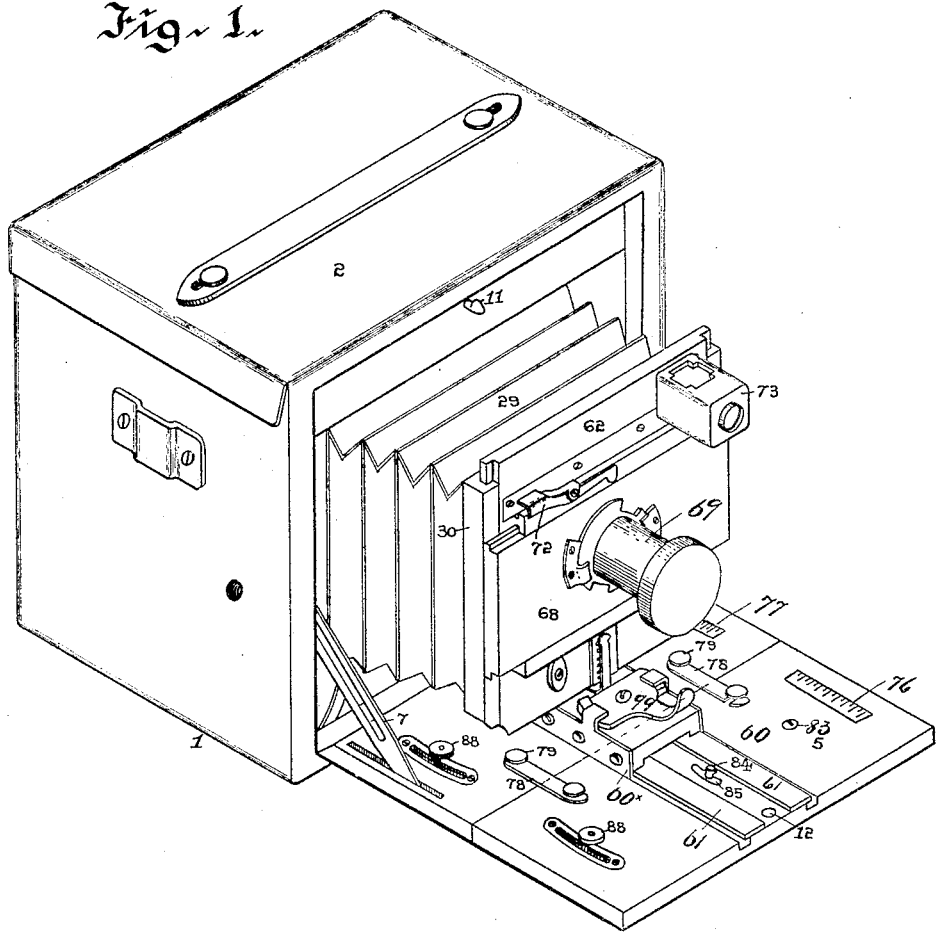
Figure 12:
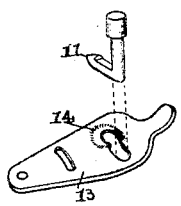

In the accompanying drawings, Figure 1 is a perspective view of a camera constructed in accordance with my invention, showing the camera-front drawn partly out in position for use; Fig. 2, a side elevation with one end of the casing broken away to show the swing-back and the means for operating it; Fig. 3, a top plan view, partly in section, with the cover removed; Fig. 4, a front view of the camera-front with the base-board in section, showing the focusing devices; Fig. 5, a bottom plan view of said focusing devices; Fig. 6, a detail view of one of the corners of the swing-back and the levers for adjusting it; Fig. 7, a sectional view on the line $x\ x$ of Fig. 2; Fig. 8, a sectional view on the line $y\ y$ of Fig. 2; Fig. 9, a sectional view on the line $z\ z$ of Fig. 6; Fig. 10, a sectional view on the line $a\ b$ of Fig. 2; Fig. 11, a perspective view of a portion of the camera-back and the means for holding the ground-glass frame in position; Fig. 12, a detail of the front catch-lock.

Similar reference-numerals in the several figures indicate similar parts.

In the drawings, 1 indicates the inclosing casing or frame, open at the front and top, having a hinged back or door 3 and adapted to contain the operating parts of the camera. Located within this casing is the camera-frame, embodying a base-board 4, at the forward portion of which is secured the camera-front 5 (preferably made in two parts hinged together, as will be presently described) and an upright or preferably rectangular frame 6. Said front piece 5 is hinged to the bottom-board 4 at its lower edge and connected by slotted links 7 with the frame 6, suitable screws 8 operating in the slots in said links, said slots being provided with an offset at one end, with which the shanks of the screws 8 engage when said links are pressed forward by the springs 9, secured to the frame 6, (shown in dotted lines in Fig. 2,) this construction holding the front or bed 5 in horizontal position, and springs 10 are secured to the frame 6, operating to engage the front 5 and press it forward, which arrangement is specifically described in Letters Patent No. 442,216, granted me December 9, 1890.

When the front 5 is closed up, it is retained by a suitable spring-operated catch 11, engaging a recess 12 in the front. Hinged to the front portion of the top of frame 6 is a lid or cover 2, arranged, when the frame is secured in the inclosing casing 1 by suitable fastenings, as screws, to coöperate with the side walls of said casing and form a cover for the operating parts of the camera, said lid having a depending flange or portion at the rear provided with a projection 16, coöperating with a spring lock or catch 15, attached to the upper portion of the rear door 3, so that the camera may be closed and locked, if desired, by a single fastening.

Arranged upon the top of the frame 6 is a pivoted plate 13, having a slot through which passes the shank of the spring-catch 11 and having raised projections 14 on opposite sides of said slot, near one end, operating when moved backward from the position shown in Fig. 3 to engage the under side of the head of the catch and prevent its operation in a direction to release the front. The head of this catch is arranged directly beneath the flexible covering of the top 2, so that it may be depressed without opening the case to drop the camera-front 5, unless it is retained from operation by means of the plate 13, as shown clearly in Figs. 2 and 12.

Secured to the sides of the frame 6 are plates 20, one being arranged on each side, having slots 21 and 22, as shown in Figs. 2 and 8, provided with enlarged apertures at their rear ends, and in the slots 21 are arranged the shanks of lugs or projections 23, having enlarged heads on the inner sides of the plates, and secured to said plates 24 and passing through the slots 22 in the plates 20 are pins 25, pivoted to round studs 26, operating loosely in suitable apertures in the sides of the swing-back 27, the construction being such that the back 27 can be tilted on the studs 26 or the plates 24 can be moved back and forth independently on the frame 6, the studs 26 turning on the pivots 28, connecting them with the pins 25, thereby permitting a vertical or lateral tilting motion of the swing-back, which latter is, as usual, connected by the bellows 29 with the movable front 30, carrying the lens. The plates 20, it will be noted, are practically a part of the frame 6.

As a means for causing the various movements of the swing-back and securely locking the latter in any position in which it may be adjusted I pivot loosely upon each of the pins 25 a lever 31, the lower end of which is pivoted to the bottom board 4 and the upper end provided with threaded stud 32, passing through segmental slot in plate 33, pivoted at 34 on the frame 6. The upper sides of the slots in said plates are provided with slight depressions or insets 35, as shown in dotted lines, Fig. 2, for engaging the pins 32 when the top and bottom of the swing-back 27 are parallel with the front of the camera, small springs 36, secured to the frame and operating on the plates 33, moving the latter downward to insure the coöperating of the depression and pin, and suitable clamp-nuts 37 on the pins 32 serve to clamp and hold the levers 31 in any position to which they may be adjusted, as will be understood.

As a means for adjusting and securing the swing-back when tilted vertically on the studs 26 I provide one of the plates 24 with an upward extension 38, having a segmental upper edge with stops at the end of the same, and arrange upon the top of the swing-back a bracket 39, through which passes a threaded pin 40, having a longitudinal groove 41, with which engages a small projection 41× (see Fig. 9) on the bracket 39 for preventing said pin from turning, and upon the outer end of this pin is provided a head 42, engaging the outer side of the extension-plate 38, and upon the pin is arranged a securing-nut 43, adapted to clamp the side of the bracket 39 and the extension-plate 38 together when moved outward. It will be seen that by loosening the nut 43 the swing-back can be tilted on the studs 26, and by tightening said nut it can be secured in any position to which it may be adjusted. In order that the operator can tell when the swing-back is in vertical position, I secure to the side of the latter a small spring 44, having a projection 45, adapted to enter a corresponding slight recess in the inner side of the plate extension 38, as shown in Figs. 2 and 10, which spring can be readily disengaged by a positive movement.

The swing-back 27 is provided at the ends with rearwardly-projecting extensions or wings 46, provided with slots 47, and pivoted upon the outer sides of said extensions are plates 48, having ears 49, projecting into, but in the present construction not through, the slots and adapted to coöperate with the ground-glass frame 50 or a plate or film-roll holder which may be applied to the camera-back. Two of these plates are provided on each of the extensions 46 and are arranged so that the lugs 49 will engage the ground-glass frame or plate-holder near the top and bottom, and each pair is pressed forward by a spring 51, composed, preferably, of a single piece of elastic wire, the ends of which operate loosely through lugs 52 on the plates 48, while the central coil is secured in a recess in the frame extension 46 by means of a pin 53, as shown in Fig. 2.

The ground-glass frame 50 in the present instance is provided with lugs 54, which when the frame is applied to the camera-back slide down suitable grooves 46′ in the extensions 46 and then pass into the segmental slots and are operated upon by the lugs 49 of the pivoted plates 48. It will be seen that the ground-glass frame can be applied and removed readily when desired, and also that a plate-holder can be inserted between the camera-back and the ground-glass frame, the latter moving out against the tension of the springs 51, the extensions 54 operating in the segmental slots of the part 46 and preventing the vertical displacement of the ground-glass frame and not interfering with the application or removal of the plate-holder, and as the ears 49 of the plates 48 do not project beyond the inner surface of the side pieces 46 a roll-holder may be readily applied to the camera-back, if desired, which might be too thick to be accommodated between the ground-glass plate and the camera-back, said roll-holder being secured in position by any suitable fastenings and resting upon the bottom extension of the said back. By employing the four independent plates 48, actuated by the springs, as described, it will be seen that the parts can be made in quantity and applied to any camera-back, irrespective of its size.

It is desirable that means be provided for permitting the escape and entrance of air to the interior of the bellows of a camera, particularly when the rear is kept closed by a roll or plate holder; and in order to provide for this I arrange suitable passages 90 in the camera-back 27, passing from the interior of the bellows to the exterior, said passages being sufficiently circuitous to prevent the entrance of light, and opening at the front of the swing-back, as shown in Fig. 11. It will be understood that the devices for holding the plate-holder or ground-glass frame are applicable to cameras not having swing-backs.

The movable front 30, to which the forward end of the bellows is attached, is connected to a sliding block 60, provided with depending and inwardly-extending flanges $60^\times$ and adapted to be locked in position on the ways 61, secured to the hinged front 5 by a cam 99, as described in my former patent, and is provided, as usual, with the grooves at the sides in which the rising front 62 slides, said front 62 having a slotted plate 63 attached to it, with which a spring 64, connected to the block 60, is adapted to coöperate to hold said front in any position of vertical adjustment desired, though permitting its movement when positively operated.

65 indicates a movable frame held in position on the rising front by means of a plate 66, engaging a groove therein, and the buttons 67, as shown in Fig. 4, and sliding laterally in this frame is a lens-board 68, having the lens 69 secured to it as shown, or in any other suitable manner. For the purpose of securing the lens-board in any position of lateral adjustment desired I provide upon its upper edge a rack 70, with which coöperates a tooth or pin 71 on the end of a spring-operated catch 72, connected to the frame 65, as shown in Fig. 4, said catch being readily disengaged by pressure on its free end. A finder 73 is pivoted to the upper corner of the rising front 62, as also shown in said figure.

Connected to the front of the camera is an index 75, arranged to coöperate with either of two scales 76 77, attached to the board 5, carrying the ways for the front of the camera, the indications on the former indicating the proper focus when a long-focus lens is used and the latter when using a short-focus lens, and it is desirable to provide a fine adjustment for focusing, either when using the camera as a view-camera, employing the ground glass and opening the door 3 to inspect the image, or when a roll-holder is employed and the distance-scales are relied upon for focusing. To prevent the part 5 from interfering with the view when a short-focus lens is employed, I make said front board 5 in two parts, hinged together at 5' and normally retained in line by plates and securing-screws 78 79, respectively, as shown in Figs. 1, 2, and 3, so that by loosening one of the screws the plates can be turned and the outer portion of the board 5 dropped down, as indicated in Fig. 2, dotted lines, the index 75 then coöperating with the scale 77.

In order that a fine adjustment in focusing may be had when either a long or short focus lens is employed, I provide upon the bottom of the block 60 a plate 80, having a series of recesses, and arrange within a recess in the lower side of each of the parts of the front 5 (though covered by the covering material thereof) an adjusting-lever 81, having a slot 82 at one end, through which passes a pin or screw 83, on which said lever is pivoted and is permitted a longitudinal movement, and upon the upper side of this lever is a pin 84, projecting up through a slot 85 and adapted to engage when the lever is moved longitudinally, as indicated in dotted line, Fig. 5, with one of the recesses in the plate 80, and thereby establish connection with the camera-front, so that the latter may be moved by the lever, which will turn upon the pivot-pin 83. The outer end of the lever is provided with a threaded stud 86, extending up through a slotted plate 87, secured on the board 5 and provided with a securing-nut 88, which serves not only as a means for clamping the lever in any position to which it may be adjusted, but also as a handle for moving it longitudinally and securing it, with the pin 84, out of the path of the plate 80 on the lower side of the block 60. As the two levers 81 and their securing and manipulating devices are the same, a description of one will suffice for both, it being understood that one of them is in such position that its lug will engage the lens-support when a short-focus lens is used, and the other when using a long-focus lens.

Though it is desirable in a camera of this description to move the frame carrying the lens for focusing, and I have shown the lever for actuating this part, I do not wish to be limited to precisely this arrangement, as it is within my invention to cause the relative movements of the lens and focusing-screen or the substituted plate by substantially the same means.

It will be understood that this camera can be used as a detective-camera, with a roll or plate-holder applied to the swing-back, and also as a view-camera, the ground-glass being employed for focusing, and by lowering the door 3 the rear portion of the chamber will be found sufficiently dark to dispense with a focusing cloth or hood.

While I prefer to employ the various adjustments of the front and back in a camera embodying an inclosing casing as shown herein, I do not wish to be confined to such a one, as it will be understood that said devices can be applied to a camera of any description.

I claim as my invention—

1. In a camera, the combination with the inclosing casing embodying the sides, bottom and rear portions, and open at the front and top, of a camera-frame separate from the casing having the bottom board, a front board hinged to the latter at the front, a movable camera-front and ways therefor on the bottom and front boards, and the lid hinged to the upper portion of the camera-frame and coöperating with the rear and sides of the casing, substantially as described.

2. In a camera, the combination with the inclosing casing embodying the sides and bottom and having the hinged door at the rear, of the camera-frame separate from the casing having the bottom board, a front board hinged to the latter at the front, a movable camera-front and ways therefor on the bottom and front boards, the lid hinged to the upper portion of the camera-frame and coöperating with the sides of the casing and with the rear door, and a locking device between the lid and the rear door, substantially as described.

3. In a camera, the combination with the main supporting-frame, of the swing-back, the plates movable on the frame and to which the swing-back is pivoted to tilt vertically, and the independent levers pivoted to the frame and to the plates, substantially as described.

4. In a camera, the combination with the main frame, of the plates movable on the frame, and the swing-back pivoted on the plates to tilt vertically or laterally, substantially as described.

5. In a camera, the combination with the main frame, a supporting-plate 24 movable thereon in a horizontal plane, and having the stud 26 pivoted to the plate to turn in a horizontal plane, of the swing-back having an aperture in its side in which the stud 26 extends loosely, and a support for the opposite side of the swing-back; whereby the swing-back may be tilted vertically turning on the stud or its side moved backward and forward causing the stud to turn on its pivot.

6. In a camera, the combination with the main frame, and the two supporting-plates 24 movable thereon in a horizontal plane, and the studs 26 pivoted to the plates to turn in a horizontal plane, of the swing-back having the apertures in the sides in which the studs project loosely, and the independent levers pivoted to the frame and to the plate, substantially as described.

7. In a camera, the combination with the main frame, of the supporting-plates movable thereon, the swing-back pivoted on the plates to turn laterally, the pivoted levers engaging the plates and locking devices for securing the levers when adjusted, substantially as described.

8. In a camera, the combination with the main frame, of the supporting-plates movable thereon, the swing-back pivoted on the plates to turn laterally, the pivoted levers engaging the plates and having the studs and securing nuts, and the plates 33 with which said nuts coöperate, substantially as described.

9. In a camera, the combination with the main frame, of the supporting-plates movable thereon, the swing-back pivoted on the plates to turn laterally, the levers engaging the plates having the studs, the spring-operated plates having the centering-notches, and the securing-nuts, substantially as described.

10. In a camera, the combination with the main frame, of the supporting-plates movable thereon, the swing-back pivoted on the plates to tilt vertically, one of said plates having a depression and a centering-spring on the swing-back having a projection coöperating with said depression to hold the swing-back when the latter is in vertical position, substantially as described.

11. In a camera, the combination with the main frame, of the supporting-plates movable thereon, the swing-back pivoted on the plates to tilt vertically, one of the plates having the extension, and the clamping-screw on the swing-back engaging the plate and securing the swing-back when adjusted, substantially as described.

12. In a camera, the combination with the main frame, of the supporting-plates movable thereon, the swing-back pivoted on the plates to tilt vertically, one of the plates having the extension, the bracket on the swing-back, the longitudinally-movable screw operating therein, and the securing-nut on the screw clamping the bracket and extension and holding the swing-back, substantially as described.

13. In a camera, the combination with the main frame, of the supporting-plates movable thereon, one of them having the extension, the pivoted studs on the plates, the swing-back loosely pivoted on the studs, detachable securing devices between the swing-back and plate extension, levers operating on the plates and detachable fastenings for said levers, substantially as described.

14. In a camera, the combination with the main frame and the slotted plates secured thereto, of the sliding plates having the lugs, the pins secured to the plates operating in the slots of the first-mentioned plates and having the studs pivoted thereon, the swing-back loosely pivoted on the studs, the levers pivoted on the pins, and fastening devices for holding the swing-back and the levers when adjusted, substantially as described.

15. The combination with the camera-back having the rearwardly-projecting extensions, of the plates pivoted thereon having the ears for coöperating with a focusing-frame or plate-holder and springs pressing the plates toward the back, substantially as described.

16. The combination with the camera-back having the rearwardly-projecting extensions, of the plates pivoted thereon having the ears for engaging a focusing-frame, and a single spring secured at its center and having its ends engaging two of said plates, substantially as described.

17. The combination with the camera-back having the rearwardly-projecting extensions and the slots extending parallel with the camera-back, of the ground-glass frame having the ears adapted to enter said slots and the pivoted plates on the extensions engaging said ears and springs for moving the pivoted plates, substantially as described.

18. The combination with the camera-back having the rearwardly-projecting extensions slotted on their inner sides and having the apertures extending through them, of the plates pivoted on the outer sides of the extensions having the ears projecting through the apertures, springs for moving them toward the back, and the ground-glass frame having the lugs at the sides, substantially as described.

19. The combination with the camera-back having the extensions provided with apertures, the plates pivoted on the outer sides of the extensions having ears extending through the apertures, and the springs secured to the extensions at their centers having their free ends engaging the plates, substantially as described.

20. In a camera, the combination with the bed or support having ways thereon, of the frame movable for focusing, the longitudinally-movable, pivoted focusing-lever connecting the frame and bed when moved longitudinally in one direction and detachable from one of them when moved in the other, substantially as described.

21. In a camera, the combination with the bed or support having ways thereon, of the movable lens-carrying frame, the longitudinally-movable focusing-lever pivoted to the bed and adapted to coöperate with the lens-carrying frame when moved longitudinally and then to actuate the latter when moved on its pivot, substantially as described.

22. In a camera, the combination with the bed or support having ways thereon, of the movable lens-carrying frame, having the recess in its under side, the longitudinally-movable focusing-lever having the pin adapted to engage the recess in the frame and the securing-screw for holding the focusing-lever, substantially as described.

23. In a camera, the combination with the bed or support having ways thereon, of the movable lens-carrying frame having the series of recesses in its under side, the focusing-lever having the slot and the engaging pin or projection and the pivot-pin in the bed, substantially as described.

24. In a camera, the combination with the main frame, the hinged front having the ways thereon, and the lid or cover, of the catch on the frame coöperating with the front when closed, and the lock arranged beneath the cover for preventing the operation of the catch, substantially as described.

25. In a camera, the combination with the inclosing casing, the hinged front, the lid or cover, and the rear door, of the catch for retaining the front when closed, the lock for preventing its operation arranged beneath the lid, and coöperating catches on the lid and rear door, whereby the camera may be completely closed and locked by a single locking device, substantially as described.

FRANK A. BROWNELL.

Witnesses:
 FRED F. CHURCH,
 G. A. RODA.